United States Patent
Hyyppä et al.

(10) Patent No.: US 7,424,115 B2
(45) Date of Patent: Sep. 9, 2008

(54) GENERATING ASYMMETRIC KEYS IN A TELECOMMUNICATIONS SYSTEM

(75) Inventors: Timo Hyyppä, Espoo (FI); Kari Miettinen, Klaukkala (FI)

(73) Assignee: Nokia Corporation, Espoo (FI)

( * ) Notice: Subject to any disclaimer, the term of this patent is extended or adjusted under 35 U.S.C. 154(b) by 902 days.

(21) Appl. No.: 10/428,010

(22) Filed: May 2, 2003

(65) Prior Publication Data

US 2004/0151317 A1    Aug. 5, 2004

Related U.S. Application Data

(60) Provisional application No. 60/443,569, filed on Jan. 30, 2003.

(51) Int. Cl.
*H04L 9/00* (2006.01)
*H04K 1/00* (2006.01)

(52) U.S. Cl. .................. 380/44; 380/255; 713/168; 713/182

(58) Field of Classification Search .............. None
See application file for complete search history.

(56) References Cited

U.S. PATENT DOCUMENTS

| | | | | |
|---|---|---|---|---|
| 5,200,999 | A | * | 4/1993 | Matyas et al. ............... 380/277 |
| 5,201,000 | A | * | 4/1993 | Matyas et al. ............... 380/30 |
| 5,519,778 | A | * | 5/1996 | Leighton et al. ............. 380/30 |
| 5,734,720 | A | * | 3/1998 | Salganicoff ................ 380/211 |
| 5,892,900 | A | * | 4/1999 | Ginter et al. .................. 726/26 |
| 5,910,987 | A | * | 6/1999 | Ginter et al. .................. 705/52 |
| 5,915,019 | A | * | 6/1999 | Ginter et al. .................. 705/54 |
| 5,917,912 | A | * | 6/1999 | Ginter et al. ................ 713/187 |
| 5,949,876 | A | * | 9/1999 | Ginter et al. .................. 705/80 |
| 5,982,891 | A | * | 11/1999 | Ginter et al. .................. 705/54 |
| 6,058,476 | A | * | 5/2000 | Matsuzaki et al. .......... 713/169 |
| 6,195,433 | B1 | | 2/2001 | Vanstone et al. |
| 6,230,272 | B1 | * | 5/2001 | Lockhart et al. .............. 726/2 |
| 6,237,786 | B1 | * | 5/2001 | Ginter et al. ................ 213/153 |
| 6,253,193 | B1 | * | 6/2001 | Ginter et al. .................. 705/57 |
| 6,345,098 | B1 | * | 2/2002 | Matyas et al. ................. 380/46 |
| 6,363,488 | B1 | * | 3/2002 | Ginter et al. .................... 726/1 |
| 6,389,402 | B1 | * | 5/2002 | Ginter et al. .................. 705/51 |
| 6,397,307 | B2 | * | 5/2002 | Ohran ....................... 711/161 |
| 6,427,140 | B1 | * | 7/2002 | Ginter et al. .................. 705/80 |
| 6,445,794 | B1 | * | 9/2002 | Shefi ........................... 380/46 |
| 6,594,759 | B1 | * | 7/2003 | Wang ........................ 713/182 |
| 6,609,183 | B2 | * | 8/2003 | Ohran ....................... 711/161 |

(Continued)

FOREIGN PATENT DOCUMENTS

EP    0 534 420 A2    3/1993

(Continued)

*Primary Examiner*—Christopher A Revak
(74) *Attorney, Agent, or Firm*—Squire, Sanders & Dempsey, L.L.P.

(57) ABSTRACT

A method for creating a key pair in a telecommunications system comprises a user terminal and at least one network node serving the user terminal. In the method, upon a successful user authentication, a first seed value is composed in the user terminal and a second seed value is composed in the network node, such that the seed values are identical. Based on the seed values, respective public/private key pairs are generated, such that the generated public/private key pair in the user terminal and the generated public/private key pair in the network node are identical.

28 Claims, 3 Drawing Sheets

U.S. PATENT DOCUMENTS

| | | | | |
|---|---|---|---|---|
| 6,640,304 | B2 * | 10/2003 | Ginter et al. | 713/193 |
| 6,760,752 | B1 * | 7/2004 | Liu et al. | 709/206 |
| 6,871,276 | B1 * | 3/2005 | Simon | 713/156 |
| 6,931,128 | B2 * | 8/2005 | Roberts | 380/44 |
| 6,948,070 | B1 * | 9/2005 | Ginter et al. | 713/193 |
| 7,051,212 | B2 * | 5/2006 | Ginter et al. | 713/193 |
| 7,069,451 | B1 * | 6/2006 | Ginter et al. | 705/51 |
| 7,076,652 | B2 * | 7/2006 | Ginter et al. | 713/153 |
| 7,089,426 | B1 * | 8/2006 | Bagshaw | 713/193 |
| 7,095,854 | B1 * | 8/2006 | Ginter et al. | 380/233 |
| 7,100,199 | B2 * | 8/2006 | Ginter et al. | 726/4 |
| 7,107,418 | B2 * | 9/2006 | Ohran | 711/161 |
| 7,120,696 | B1 * | 10/2006 | Au et al. | 709/229 |
| 7,120,800 | B2 * | 10/2006 | Ginter et al. | 713/193 |
| 7,124,302 | B2 * | 10/2006 | Ginter et al. | 713/189 |
| 7,133,845 | B1 * | 11/2006 | Ginter et al. | 705/51 |
| 7,149,308 | B1 * | 12/2006 | Fruehauf et al. | 380/44 |
| 2006/0177056 | A1 * | 8/2006 | Rostin et al. | 380/46 |

FOREIGN PATENT DOCUMENTS

WO     WO 99/25086     5/1999

* cited by examiner

GENERATING ASYMMETRIC KEYS IN A TELECOMMUNICATIONS SYSTEM

CROSS-REFERENCE TO RELATED APPLICATIONS

This application claims priority of U.S. Provisional Patent Application Serial No. 60/443,569 entitled, "Generating Asymmetric Keys in a Telecommunications System," filed Jan. 30, 2003, the entire contents of which are incorporated herein by reference.

BACKGROUND OF THE INVENTION

1. Field of the Invention

The present invention relates to cryptography in a cellular telecommunications system, and more particularly to generating asymmetric cryptographic keys.

2. Description of the Related Art

Ciphering is used in many data transmission systems to prevent the transmitted data from getting into the hands of an unauthorized user. Ciphering has become more significant in the recent years, particularly as wireless telecommunication has become more common. An example of such a wireless telecommunication system is the Universal mobile communications system (UMTS). In the UMTS a part of the network is implemented wirelessly, and the data transmission is carried out on the radio path. The radio path is an open resource and it involves security risks. In digital mobile communications systems various solutions have been developed to arrange data protection, for example ciphering methods and user identification, i.e. authentication, methods.

Ciphering means converting data into such a form from which it is possible to interpret the original content of the data only by using a related reverse method. The ciphering can be performed, for example, by encrypting the information to be transmitted in a transmitter, and by decrypting the information in a receiver. In the encryption means, the information to be transmitted, for example a bit stream, is multiplied by certain encryption bits, after which it is difficult to find out what the original bit stream was if the used encryption bit pattern is not known.

A ciphering key is a sequence of symbols or bits used for ciphering data according to a given cryptographic algorithm. Symmetric cryptography refers to ciphering where the same ciphering key is used both for encrypting and decrypting data. In symmetric cryptography the different network nodes share the same secret ciphering key, and the decrypting algorithm is the reverse function of the encrypting algorithm.

Asymmetric cryptography means ciphering where a different ciphering key is used for encrypting and decrypting data. In asymmetric encryption two related cryptographic keys, a public key and a private key, are used. A public key is an encryption key belonging to a user, and it is publicly available also to others than the user. A private key is a decryption key belonging to a user, and the user keeps it secret and in restricted use.

Public key infrastructure (PKI, also known as public key encryption or public key cryptography) is an example of a system for asymmetric cryptography where one ciphering key is a public key and the other a private key. In public key infrastructure a trusted third party or a certification authority provides the users with a set of ciphering keys, confirms them with an electronic signature, delivers them to the users, maintains a certificate file and a certificate revocation list. From the certificate file and the certificate revocation list anyone is able to check the certificate they have received and its validity. A public key certificate is an electronically signed data unity, which confirms that the identifier used in an electronic signature belongs to a specific person or organization and is still valid. In PKI, a public key is used for encrypting data and a private key for decrypting encryption. An example of PKI is RSA encryption, which is based on the cryptographic algorithm developed by Rivest, Shamir and Adleman. With RSA encryption, it is possible to cipher a message before transmitting it to the receiving party via an unreliable transmission channel. The transmitting party knows the public key of the receiving party and encrypts the message using the public key before transmitting it. The receiving party knows the private key and is able to decrypt the message by using the private key. Certification authority (CA) may refer to a public authority, or it may be a function of the network operator. Certification authority is responsible for issuing and managing user certificates. An issued certificate may comprise information of the issuer of the certificate, it may bind a public key to the identity of the user, or it can make a more specific statement, for example, that a user is authorized to get a certain service.

PKI may also be utilized in digital signatures. By means of a digital signature, the identity of the transmitting party and the integrity of the signed material can be ensured. A digital signature may be obtained using the private key as an encryption key and the public key as a decryption key. The obtained digital signature is then attached to the signed material before transmitting it.

Authentication and key agreement (AKA) is a mechanism of the mobile system, which enables authentication between the user and the serving network. AKA establishes a cipher key (CK) and an integrity key (IK) between the user and the serving network using the secret key (K). The IK is a data protection key used for ensuring that the data has not been altered during transmission, and the CK is a symmetric ciphering key.

In current systems, dynamic user certificates are provided to the users such that a public/private key pair is first created in the user terminal. After the creation of the public/private key pair, the user terminal sends a certificate request to the certification authority. As a response to receiving the certificate request, the certification authority issues the public key certificate and transmits an acknowledgement to the user. The public key certificate confirms that a cryptographic key, i.e. the public key, is valid and can be trusted.

A disadvantage in the arrangement described above is that the system has to carry a considerable amount of request and response messages between the user terminals and the certification authority. This causes load on the network, and, moreover, the authentication of these response or request messages one by one can be a problem.

SUMMARY OF THE INVENTION

The present invention comprises bootstrapping asymmetric keys from a symmetric key infrastructure. The idea of the invention is to derive the same public/private keys both on the user terminal side and on the network side. According to the invention, an initial value, referred herein as a "seed value", is calculated in the system when a successful authentication of a user terminal has taken place. The seed value is calculated both on the user terminal side and on the network side of the system using the same algorithm, and the calculation is based, for example, on the values of the ciphering key (CK) and the integrity key (IK). As the seed values on the user terminal side and on the network side are calculated based on the same algorithm and same CK and IK, they are identical for a particular authentication transaction. On the basis of the calculated seed value, a public/private key pair is generated. Like the seed value, also the public/private key pair is created both on the user terminal side and on the network side, and both sides use the same application for key generation. Thus, the public/private key pairs created on the user terminal side and on the network side are identical for a particular authentication transaction. When the public key has been generated it has to be certified by the network side. According to the invention, the network automatically issues and stores a public key certificate.

One advantage of the invention is that there is no need for separate certificate requests (including authentication and proof-of-possession) by the users since the network automatically issues the user certificates as the network already knows the public key to be certified (and the corresponding private key). Moreover, there is no need to distribute the keys over the radio path since the same public/private key pair is created from the existing symmetric key material simultaneously both on the user terminal side and on the network side, upon successful authentication of the user.

Another advantage of the invention further includes the sufficient cryptographic strength of the private key. Certificate issuance by the CA is immediate. The invention also provides a convenient and secure method for private key backup, and automatic and configurable update of keys and certificates. Lifetime of the keys and certificates can be configured, so the need for revocation may be significantly reduced.

BRIEF DESCRIPTION OF THE DRAWINGS

In the following the invention will be described in greater detail by means of preferred embodiments with reference to the accompanying drawings, in which.

DETAILED DESCRIPTION OF THE PREFERRED EMBODIMENTS

In the following, preferred embodiments of the invention will be described with reference to a third generation mobile communications system UMTS. This invention is not, however, meant to be restricted to these embodiments. Consequently, the invention may be applied in any mobile communications system providing services that require cryptographic keys. Such systems include, for instance, what are called the $3^{rd}$ generation systems, such as UMTS, and systems based on GSM (Global system for mobile communication) or corresponding systems, such as GSM2+ systems and the future $4^{th}$ generation systems. The specifications of mobile communications systems and particularly those of the UMTS advance rapidly. This may require additional changes to the invention. For this reason, the terminology and the expressions used should be interpreted in their broadest sense since they are meant to illustrate the invention and not to restrict it. The relevant inventive aspect is the functionality concerned, not the network element or equipment where it is executed.

Figure 1:
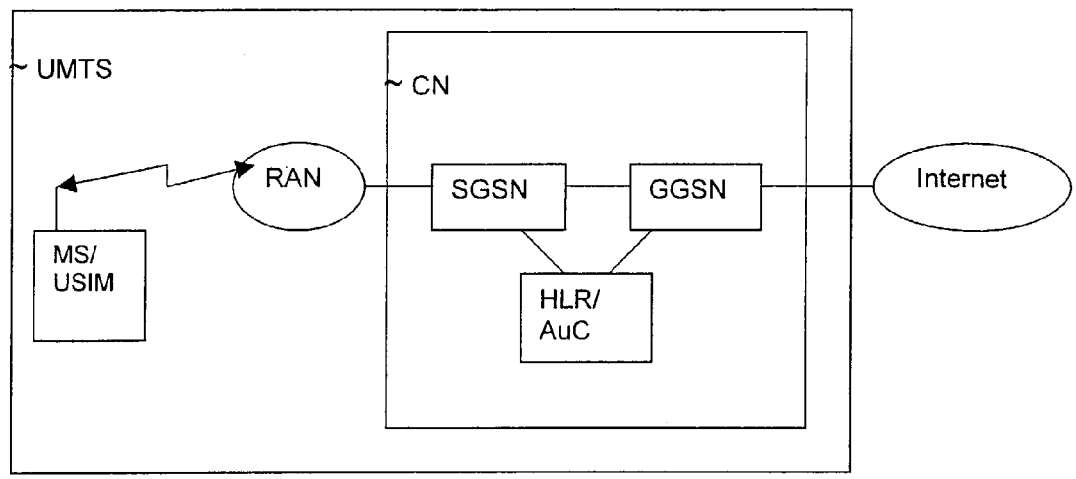
FIG. 1 illustrates the UMTS network architecture.

FIG. 1 shows a simplified version of the UMTS architecture, which illustrates only the components that are essential to illustrate the invention, even though those skilled in the art naturally know that a general mobile communication system also comprises other functions and structures, which do not have to be described in more detail herein. The main parts of the UMTS are a core network CN, a UMTS radio access network (UTRAN) (Universal terrestrial radio access network) and a mobile station MS. The mobile station MS can be a simplified terminal intended only for speech, or it can be a terminal for multiple services operating as a service platform and supporting the loading and execution of different service-related functions. The mobile station MS comprises actual mobile equipment and an associated removable identification card USIM (Universal subscriber identity module). The subscriber identity module USIM is a smart card containing the subscriber identity, executing authentication algorithms and storing related cryptographic keys and subscriber data needed at the mobile station.

The packet switched portion of the UMTS utilizes the general packet radio service (GPRS). The GRPS system comprises a serving GPRS support node (SGSN) and a gateway GPRS support node (GGSN). The SGSN handles the registration processes of the mobile stations MS, transmits data packets to and receives them from the mobile station MS, and maintains a register of the locations of the mobile stations MS. The GGSN connects the GPRS network of the operator to external systems, such as the GPRS systems of other operators, or data networks, such as the Internet.

Authentication center (AuC) is a network element, which is typically implemented as a part of the subscriber register HLR (Home location register). The authentication center stores subscriber related authentication data and authentication algorithms. AuC selects, on the basis of the subscriber's IMSI (International mobile subscriber identity), a secret user-specific authentication key K. The operation of the AuC/HLR according to the preferred embodiment of the invention is described below with reference to FIGS. 2, 3 and 4.

The user authentication process involves also a Home environment sequence number ($SQN_{HE}$) and a Mobile station sequence number ($SQN_{MS}$). $SQN_{HE}$ is an individual counter of the home network for each user, and $SQN_{MS}$ comprises the highest sequence number the respective USIM has accepted. These counters are incremented upon a successful authentication. Home environment HE means the (network) environment responsible for enabling a user to obtain mobile services, regardless of the user's location or the terminal used.

The asymmetric key pairs (e.g. an RSA key pair) may be created by suitable key generator applications. The cryptographic strength of the resulting key pair is directly proportional to the quality of the "source of randomness". The source of randomness in software implementation depends on a "seed value", which is given as input to the key generator application. The seed length of 256 bits is usually considered sufficient for the usual key pairs of public key systems.

Figure 2:
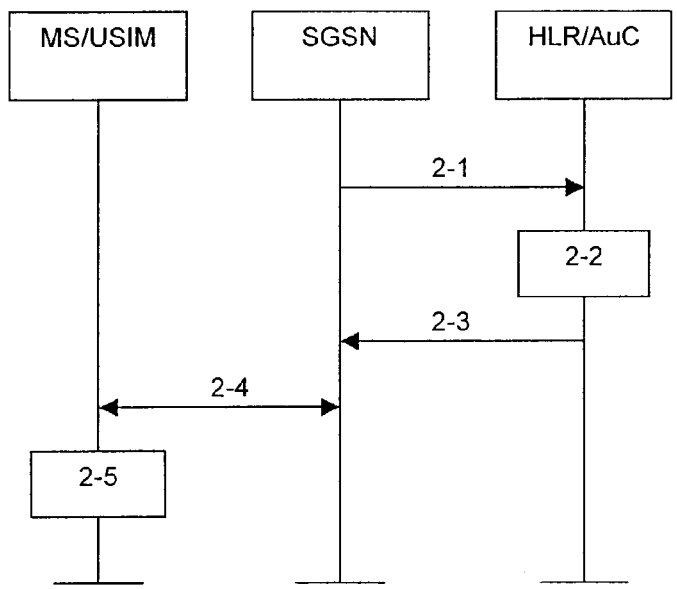
FIGS. 2 and 3 illustrate signalling according to a preferred embodiment of the invention.
Figure 3:
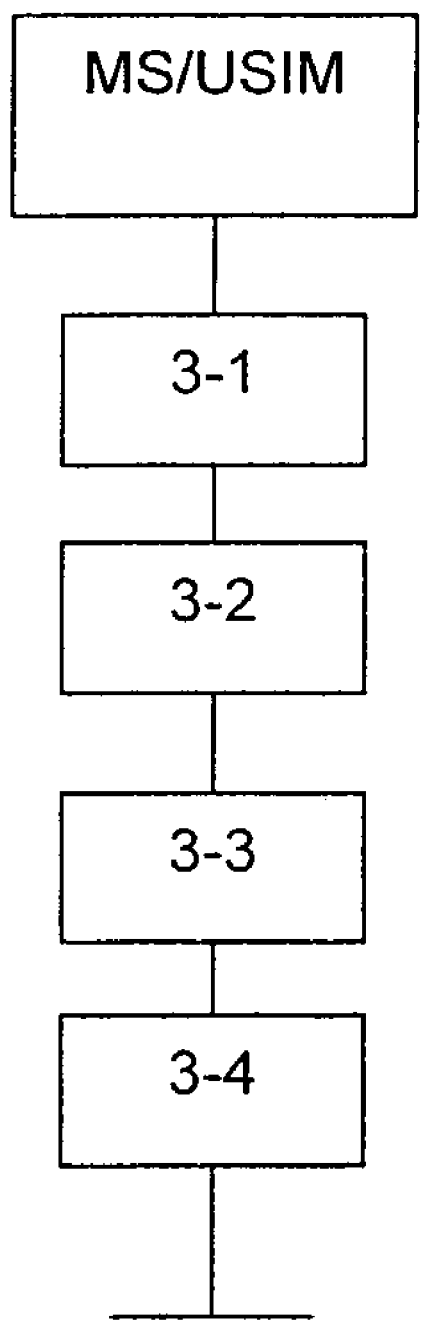
Figure 4:
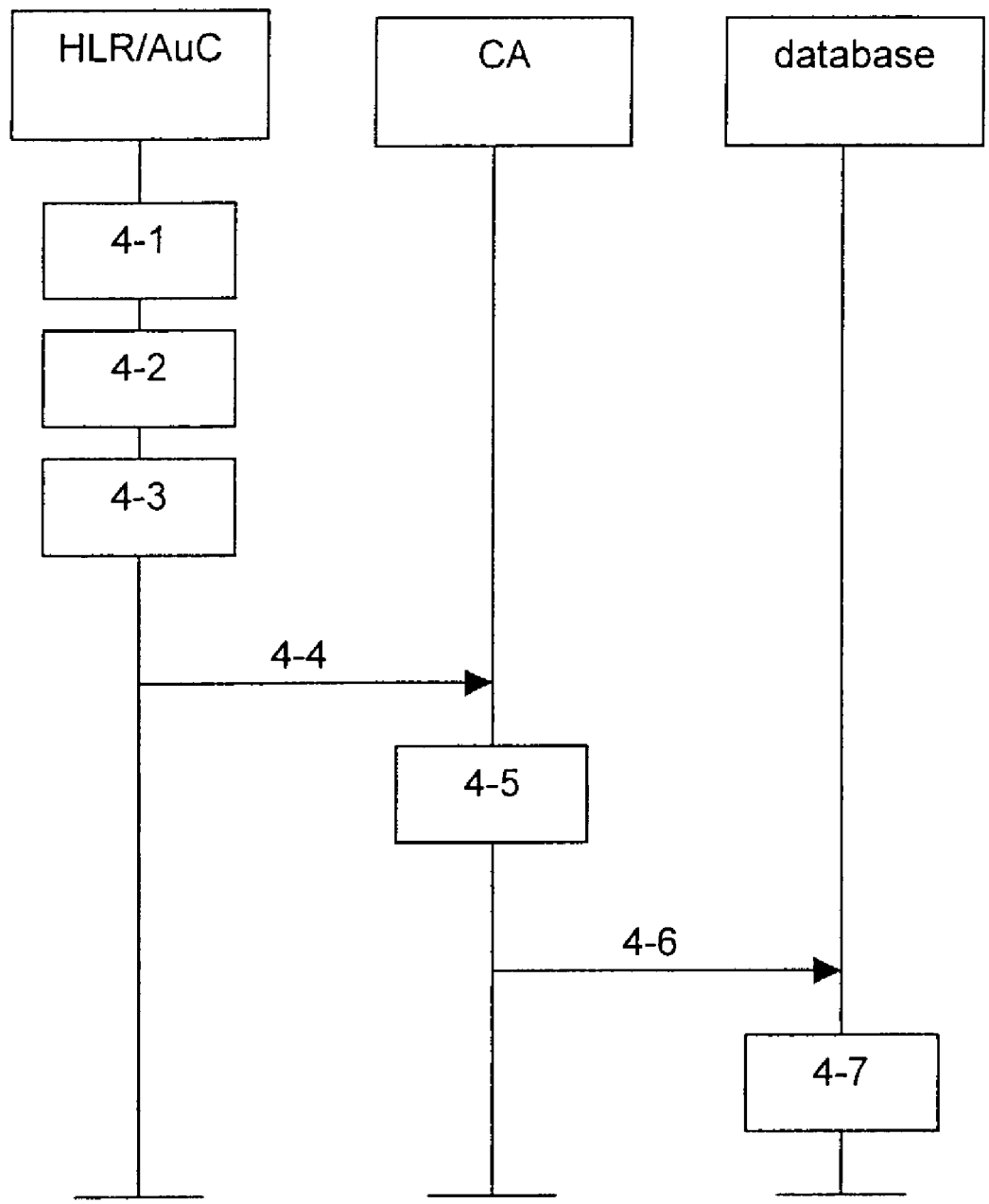
FIG. 4 is a flowchart illustrating a preferred embodiment of the invention.

FIGS. 2, 3 and 4 show functions according to the preferred embodiment of the invention in order to successfully generate asymmetric key pairs. In the embodiment, network elements of the system presented in FIG. 1 are utilized.

Referring to FIG. 2, the SGSN begins the user authentication procedure in the network by transmitting an authentication data request message 2-1 to the HLR/AuC. The message comprises identification information of the user, such as IMSI. In the HLR/AuC, in step 2-2, the $SQN_{HE}$ is incremented and stored in HLR/AuC. The incrementing of the $SQN_{HE}$ triggers a process, which is described below in connection with FIG. 4. In step 2-3, an authentication data response message is transmitted from the HLR/AuC to the SGSN. In step 2-4 the AKA procedure is performed between MS/USIM and the serving network as described above. CK and IK are given by equations:

$$CK = f3_K(RAND) \quad \text{Equation I}$$

and $$IK = f4_K(RAND) \quad \text{Equation II}$$

where f3 and f4 are common 3GPP (3$^{rd}$ generation partnership project) key generating functions, and RAND is a random authentication challenge created by the network. In step 2-5 the SQN$_{MS}$ is incremented and stored in the user terminal MS/USIM. The incrementing of the SQN$_{MS}$ triggers a process, which is described below in connection with FIG. 3.

FIG. 3 shows a process, which is carried out after the process shown in FIG. 2 so that the step 3-1 of FIG. 3 corresponds to the step 2-5 of the FIG. 2. After the SQN$_{MS}$ has been incremented in step 3-1 (corresponding the step 2-5 in FIG. 2), the seed value is calculated in step 3-2 such that:

$$seed = prf(CK, IK) \quad \text{Equation III}$$

where prf is a pseudorandom function, based e.g. on SHA1 (Secure hash algorithm 1). Thus the seed value is calculated by feeding CK and IK as inputs to the pseudorandom function, which accepts two 128-bit long arguments (i.e. IK and CK), and produces a 256-bit long output (i.e. the seed value). The pseudorandom function is used because CK and IK are not protected. Because of the characteristics of the pseudorandom function used, it is not possible to produce the original values of CK or IK from the resulting seed value. In step 3-3, the seed value is fed to the key generator application, which then generates a public/private key pair. The user terminal MS/USIM stores the said key pair in step 3-4 so that the private key will be protected with the PIN (Personal identification number) code of the user. In step 3-4 the public/private key pair is ready for use in e.g. ciphering data transmission between the mobile station and the network possessing the corresponding key pair.

FIG. 4 shows a process, which takes place after receiving in the HLR/AuC the authentication data request message 2-1, shown in FIG. 2, such that the step 4-1 of FIG. 4 corresponds to the step 2-2 of FIG. 2. In step 4-1, CK and IK are obtained using the above equations I and II, and, in step 4-2, the seed value is calculated using the above equation III (as described above with reference to FIG. 3, step 3-2). In step 4-3 the resulting seed value is fed into the key generator application, which then generates a public/private key pair. According to the invention, the HLR/AuC uses the same key generator application as the MS/USIM (see FIG. 3, step 3-3). Thus, as they use identical seed values, the result is an identical public/private key pair at both ends. The HLR/AuC then sends in the message 4-4 the public key to be certified to the certification authority CA. As the CA receives the certificate request message it issues a public key certificate in step 4-5, and forwards it in the message 4-6 to be stored in a repository in step 4-7. The subscriber identity in the certificate is based e.g. on the MSISDN (Mobile subscriber international ISDN number). The certificate is stored on the network side, and the user terminal can refer to it e.g. via its MSISDN. After step 4-7 the public/private key pair is ready for use in e.g. ciphering data transmission between the network and the mobile station possessing the corresponding key pair.

The signalling messages and steps shown in FIGS. 2, 3 and 4 are not in an absolute chronological order, and they can be executed in a different order from the given one. Other signalling messages can be transmitted and/or other functions can be carried out between the messages and/or steps. The signalling messages are only examples and can include only some of the aforementioned information. The messages can also include some other information. It is not essential for the invention in which signalling messages the information is transmitted or which functions and/or equations are used, but it is also possible to use other messages, functions and/or equations than those described above.

The steps from 2-2 to 2-5 of FIG. 2 and the steps 3-1 to 3-4 of FIG. 3 may be performed simultaneously or alternately with the steps 4-1 to 4-7 of FIG. 4.

In the embodiment described above, symmetric (ciphering) keys, i.e. CK and IK, are utilized to create asymmetric key pairs. The created asymmetric key pairs comprise a public key and a corresponding private key. The created asymmetric key pairs may be used e.g. for ciphering data transmissions in the system or for producing digital signatures. (In case of utilizing the invention for digital signatures, the obtained public key is used as a decryption key, and the obtained private key is used as an encryption key. This means that a message may be signed using the private key, and the signature may be verified using the public key.)

According to another preferred embodiment of the invention, a convenient and secure method for private key backup is provided. This is carried out such that the private key is stored in the security module of the HLR in step 4-3 (see FIG. 4).

According to yet another preferred embodiment of the invention, the public/private key pairs and/or the certificates are temporary, and the validity of them is based on a predetermined criteria, for example, on their lifetime. This reduces the need for revocations of the keys and the certificates in the network. The keys and the certificates may be automatically updated in the system without the need for separate update requests.

According to yet another preferred embodiment of the invention, the invention is utilized in 2G networks, such as the GSM. In this case, the CK and IK may be derived from the GSM cipher key K$_c$ using the conversion function specified in 3GPP TS 33.102 V5.0.0, section 6.8.2.3. The seed value is then generated using the CK and IK as described above with reference to FIGS. 2, 3 and 4.

The advantage of using CK and IK for obtaining a seed value is that existing parameters and functions can be utilized. However, the use of the CK and/or IK is not essential to this invention. It is only a practical way to generate the public/private key pairs through the seed values, but the proposed embodiments are not dependent on the parameters used.

The triggering of the public/private key pair generation is not necessarily based on incrementing the sequence numbers SQN$_{MS}$ or SQN$_{HE}$, but the generation of the key pair and/or the seed value may be triggered by another event in the network, for example, the amount of transmitted data exceeding a certain level.

Existing key generator applications may be utilized in the invention. However, the existing key generator applications may need modifications, for example, in order to be implemented in the user terminals.

In addition to prior art devices, the system, network nodes or mobile stations implementing the operation according to the invention comprise means for generating identical seed values in the user terminal and in the network node, means for generating, on the basis of the seed value, identical public keys in the user terminal and in the network node, and means for generating, on the basis of the seed value, identical private keys in the user terminal and in the network node. The existing network nodes and mobile stations comprise processors and memory, which can be used in the functions according to the invention. All the modifications and configurations needed to implement the invention can be carried out by means of software routines that can be added or updated and/or routines contained in application specific integrated circuits (ASIC) and/or programmable circuits, such as an electrically programmable logic device (EPLD) or a field programmable gate array (FPGA).

It will be obvious to a person skilled in the art that, as technology advances, the inventive concept can be implemented in various ways. The invention and its embodiments are not limited to the examples described above but may vary within the scope of the claims.

What is claimed is:

1. A method, comprising:
   generating a first seed value in a user terminal and a second seed value in at least one network node, such that the first and the second seed values are identical, wherein the at least one network node services the user terminal, and wherein a key pair comprises a public key and a private key; and
   generating, based on said first seed value, a first key pair in the user terminal, and, based on the second seed value, a second key pair in said at least one network node, such that the first and the second key pairs are identical,
   wherein said first and second seed values are generated using at least one of a cipher key and an integrity key.

2. The method of claim 1, wherein said first and second key pairs are generated using the same key generator application.

3. The method of claim 1, wherein generating said first and second key pair and seed values is initiated upon a successful authentication of the user terminal.

4. The method of claim 1, wherein the public key is temporary.

5. The method of claim 1, wherein the private key is temporary.

6. The method of claim 1, comprising storing a backup copy of the private key in a security module of the at least one network node.

7. A method, comprising:
   generating a first seed value in a user terminal and a second seed value in at least one network node, such that the first and the second seed values are identical, wherein the at least one network node services the user terminal, and wherein a key pair comprises a public key and a private key; and
   generating, based on said first seed value, a first key pair in the user terminal, and, based on the second seed value, a second key pair in said at least one network node, such that the first and the second key pairs are identical,
   wherein said first and second seed values are generated using a cipher key of a second generation network.

8. A method, comprising:
   generating a first seed value in a user terminal and a second seed value in at least one network node, such that the first and the second seed values are identical, wherein the at least one network node services the user terminal, and wherein a key pair comprises a public key and a private key;
   generating, based on said first seed value, a first key pair in the user terminal, and, based on the second seed value, a second key pair in said at least one network node, such that the first and the second key pairs are identical,
   incrementing an authentication counter stored in the user terminal, indicating a successful authentication of the user terminal, thus triggering a generation of the first and second key pairs through seed values in the user terminal; and
   incrementing an authentication counter stored in the at least one network node, indicating a successful authentication of the user terminal, thus triggering the generation of the first and second key pairs through seed values in the at least one network node.

9. The method of claim 8, wherein said authentication counters are user-specific.

10. A system, comprising:
    a user terminal; and
    at least one network node serving the user terminal;
    wherein the system is configured to
      generate a first seed value in a user terminal and a second seed value in the at least one network node, such that the first and the second seed values are identical; and
      generate, on the basis of the first seed value, a first key pair in the user terminal, and, on the basis of the second seed value, a second key pair in said at least one network node, such that the first and the second key pairs are identical,
    wherein said first and second seed values are generated using at least one of a cipher key and an integrity key.

11. The system according to claim 10, wherein the system is configured to initiate a generation of said first and second key pairs upon a successful authentication of the user terminal.

12. The system according to claim 10, wherein the system is configured to use asymmetric ciphering.

13. The system according to claim 10, wherein the system is configured to issue in at least one network node a certification for a public key of the second key pair and to store in the at least one network node the certification for the public key of the second key pair.

14. A system, comprising:
    a user terminal; and
    at least one network node serving the user terminal;
    wherein the system is configured to
      generate a first seed value in a user terminal and a second seed value in the at least one network node, such that the first and the second seed values are identical; and
      generate, on the basis of the first seed value, a first key pair in the user terminal, and, on the basis of the second seed value, a second key pair in said at least one network node, such that the first and the second key pairs are identical,
    wherein the system is configured to generate said first and second seed values using a cipher key of a second generation network.

15. An apparatus, comprising:
    a first routine configured to compose a second seed value, wherein the second seed value is identical to a first seed value composed in a user terminal that is serviced by the apparatus, wherein a key pair comprises a public key and a private key; and
    a second routine configured to generate, based on the second seed value, a second key pair wherein the second key pair is identical to a first key pair generated by the user terminal using the first seed value,
    wherein said first and second seed values are generated using at least one of a cipher key and an integrity key.

16. The apparatus according to claim 15, further comprising a third routine to initiate a generation of said public and related private keys upon a successful authentication of a user.

17. The apparatus according to claim 15, further comprising:
    an additional routine configured to issue certification of the public key and to store certification of the public key.

18. The apparatus according to claim 15, further comprising:
an authentication center of a telecommunications system.

19. The apparatus according to claim 15, further comprising:
a serving support node of a telecommunications system.

20. The apparatus according to claim 15, further comprising:
a subscriber register of a telecommunications system.

21. An apparatus, comprising:
a first routine configured to generate a first seed value, wherein the first seed value is identical to a second seed value composed in a network node configured to service the apparatus, wherein a key pair comprises a public key and a private key; and
a second routine configured to generate, based on the first seed value, a first key pair, wherein the first key pair is identical to a second key pair generated by the network node using the second seed value,
wherein said first and second seed values are generated using at least one of a cipher key and an integrity key.

22. The apparatus according to claim 21, further comprising a third routine to initiate a generation of said public and related private keys upon a successful authentication of a user.

23. An apparatus, comprising:
means for generating a second seed value, wherein the second seed value is identical to a first second seed value generated in the user terminal that is serviced by the apparatus, wherein a key pair comprises a public key and a private key; and
means for generating, based on the second seed value, a second key pair, wherein the second key pair is identical to a first key pair generated by the user terminal using the first seed value,
wherein said first and second seed values are generated using at least one of a cipher key and an integrity key.

24. The apparatus according to claim 23, further comprising means for initiating a generation of said public and related private keys upon a successful authentication of a user.

25. The apparatus according to claim 23, further comprising:
means for issuing certification of the public key and storing certification of the public key.

26. An apparatus, comprising:
means for generating a first seed value, wherein the first seed value is identical to a second seed value composed in a network node configured to service the apparatus, wherein a key pair comprises a public key and a private key; and
means for generating, based on the first seed value, a first key pair, wherein the first key pair is identical to a second key pair generated by the network node using the second seed value,
wherein said first and second seed values are generated using at least one of a cipher key and an integrity key.

27. The apparatus according to claim 26, further comprising:
means for initiating a generation of said public and related private keys upon a successful authentication of a user.

28. A computer program embodied on a computer-readable medium, the computer program configured to control a processor to perform operations comprising:
generating a first seed value in a user terminal and a second seed value in at least one network node, such that the first and the second seed values are identical, wherein the at least one network node services the user terminal, and wherein a key pair comprises a public key and a private key; and
generating, based on said first seed value, a first key pair in the user terminal, and, based on the second seed value, a second key pair in said at least one network node, such that the first and the second key pairs are identical,
wherein said first and second seed values are generated using at least one of a cipher key and an integrity key.

* * * * *